US012573234B2

(12) United States Patent
Fan et al.

(10) Patent No.: US 12,573,234 B2
(45) Date of Patent: Mar. 10, 2026

(54) BLINK DETECTION IN CABIN USING DYNAMIC VISION SENSOR

(71) Applicant: Harman International Industries, Incorporated, Stamford, CT (US)

(72) Inventors: Xueli Fan, Shanghai (CN); Hai Liu, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 334 days.

(21) Appl. No.: 18/334,961

(22) Filed: Jun. 14, 2023

(65) Prior Publication Data

US 2023/0410554 A1 Dec. 21, 2023

(51) Int. Cl.

| | |
|---|---|
| *G06V 40/16* | (2022.01) |
| *B60R 1/29* | (2022.01) |
| *G06V 40/18* | (2022.01) |
| *G06V 40/20* | (2022.01) |

(52) U.S. Cl.
CPC .............. *G06V 40/162* (2022.01); *B60R 1/29* (2022.01); *G06V 40/18* (2022.01); *G06V 40/20* (2022.01); *B60R 2300/108* (2013.01); *B60R 2300/80* (2013.01); *G06V 2201/07* (2022.01)

(58) Field of Classification Search
CPC .... G06V 40/162; G06V 40/20; G06V 20/597; G06V 10/14; B60R 1/29; B60R 2300/108; A61B 3/113
See application file for complete search history.

(56) References Cited

U.S. PATENT DOCUMENTS

2022/0155860 A1* 5/2022 Tzvieli .............. A61B 5/02427

OTHER PUBLICATIONS

Lee, W. et al., "The Method for Visualization and Analysis of Eye-blinking Patterns using Dynamic Vision," Proceedings of the 2019 41st Annual International Conference of the IEEE Engineering in Medicine and Biology Society (EMBC), Jul. 23, 2019, Berlin, Germany, 4 pages.
Ryan, C. et al., "Real-time face & eye tracking and blink detection using event cameras," Neural Networks, vol. 141, Sep. 2021, Available Online Mar. 27, 2021, 11 pages.
European Patent Office, Extended European Search Report Issued in Application No. 23179670.7, Oct. 5, 2023, Germany, 6 pages.

* cited by examiner

*Primary Examiner* — Andrew M Moyer
*Assistant Examiner* — Conor A O'Malley
(74) *Attorney, Agent, or Firm* — McCoy Russell LLP

(57) ABSTRACT

An eye blink detection method and system are disclosed. The eye blink detection method comprises: photographing a face using a DVS camera to obtain a stream of DVS pixels; integrating DVS pixels of the stream of DVS pixels to form a plurality of DVS frames, wherein each of the plurality of DVS frames comprises a plurality of first and second color pixels, each being associated with one or more DVS pixels indicating a brightening event and each of the second color pixel being associated with one or more DVS pixels indicating a darkening event; and determining whether there exists an eye blink action in a DVS frame of the plurality of DVS frames, wherein the determining comprises: determining whether there exists a pattern in which a first and second color region are distributed one above the other in an eye region of the at least one DVS frame.

13 Claims, 5 Drawing Sheets

Performing photographing using a DVS to obtain a stream of DVS pixels — S41

Integrating DVS pixels of the stream of DVS pixels to form DVS frames — S42

Determining an eye blink action — S43

Determining an eye-closing action — S51

Determining an eye-opening action — S52

BLINK DETECTION IN CABIN USING DYNAMIC VISION SENSOR

CROSS REFERENCE TO RELATED APPLICATIONS

The present application claims priority to Chinese Patent Application No. 202210697571.X, entitled "BLINK DETECTION IN CABIN USING DYNAMIC VISION SENSOR", and filed on Jun. 20, 2022. The entire contents of the above-listed application is hereby incorporated by reference for all purposes.

TECHNICAL FIELD

The present invention relates to an eye blink detection method and system, and more specifically to an eye blink detection method and system based on a DVS camera or an event camera. The present invention further relates to a fatigue driving detection method and system, and a vehicle including the eye blink detection system or the fatigue driving detection system.

BACKGROUND ART

Fatigue driving refers to the driver driving a vehicle in a fatigue state due to long continuous driving or other reasons. Fatigue driving can easily lead to major traffic safety accidents, and therefore there is a need to detect the fatigue state of the driver. The eye blink pattern of a person, for example, the eye blink duration and/or frequency, can indicate the state of the person, such as the level of drowsiness, and so on. The eye blink detection for the driver is a very important part of a fatigue driving detection method.

There are already techniques that use conventional cameras for eye blink detection. However, since the eye occupies a small area of the face and eye blinks are usually fast, lasting only a fraction of a second, for most conventional cameras, it is difficult to analyze the details of the eye blink pattern beyond the eye blink frequency. For example, for a conventional camera with 30 frames per second, the eye blink image photographed may be blurred. In addition, the entire eye blink usually lasts for only a few frames, making it difficult to determine the exact duration of an eye blink. High-speed cameras with frame rates in excess of 100 frames per second can perform more accurate eye blink detection. However, high-speed cameras will significantly increase the cost as well as the amount of data processing. In addition, conventional cameras have difficulty in taking clear eye blink photos in low-light conditions.

DVS cameras or event cameras are novel, biologically-inspired asynchronous vision acquisition devices. In contrast to standard frame-based conventional cameras, single pixels of a DVS camera report asynchronously streams of "events" of light intensity changes. DVS cameras have several advantages over conventional cameras: i) high temporal resolution (in milliseconds), ii) high dynamic range (140 dB vs. 60 dB for conventional cameras), and iii) low power consumption. However, there is not yet a simple and effective method for eye blink detection based on DVS cameras.

SUMMARY OF THE INVENTION

The present invention aims to provide an eye blink detection method based on a DVS camera, which can simply and accurately detect the eye blink frequency, eye blink duration, and the like.

According to an aspect of the present invention, an eye blink detection method based on a DVS camera is provided, comprising: photographing a face using a DVS camera to obtain a stream of DVS pixels; integrating DVS pixels of the stream of DVS pixels to form a plurality of DVS frames, wherein each DVS frame of the plurality of DVS frames comprises a plurality of first color pixels and a plurality of second color pixels, each of the first color pixel being associated with one or more DVS pixels indicating a brightening event and each of the second color pixel being associated with one or more DVS pixels indicating a darkening event; and determining whether there exists an eye blink action in at least one DVS frame of the plurality of DVS frames, wherein the step of determining whether there exists an eye blink action comprises: determining whether there exists a pattern in which a first color region and a second color region are distributed one above the other in an eye region of the at least one DVS frame.

According to another aspect of the present invention, an eye blink detection system is provided, the system comprising: a DVS camera for performing photographing so as to obtain a stream of DVS pixels; and a processor connected to the DVS camera, the processor being configured to execute an eye blink detection method as previously described.

According to another aspect of the present invention, a vehicle is provided, the vehicle comprising: a vehicle body; and an eye blink detection system as previously described that is mounted in the vehicle body.

DETAILED DESCRIPTION

Figure 1:
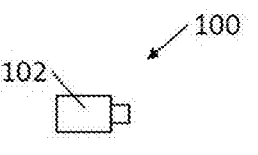
FIG. 1 illustrates a schematic diagram of an eye blink detection system according to one or more embodiments of the present invention.
Figure 1:
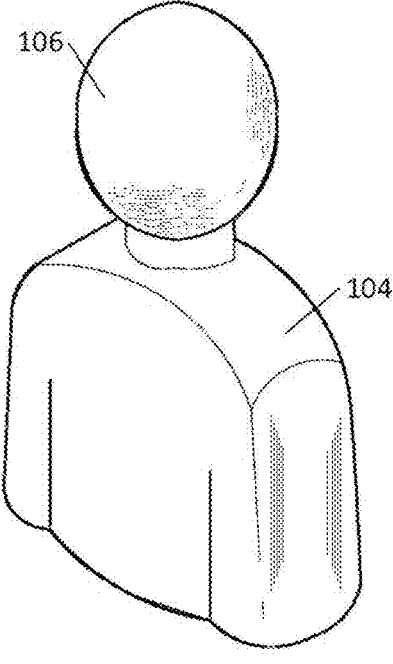

Embodiments of the present invention are described in detail below, and examples of the embodiments are illustrated in the accompanying drawings, wherein the same or similar reference numerals indicate the same or similar components or components having the same or similar functions. The embodiments described below by reference to the accompanying drawings are exemplary and are intended only to explain the present invention and are not to be construed as limiting the present invention.

As used herein, the terms "DVS camera", "event camera", "dynamic vision sensor", and "DVS" can be used interchangeably and all denote event-based cameras. The terms "DVS pixel", "pixel event", and "event" can be used interchangeably and can refer to a light intensity change captured by a DVS camera. The term "frame" or "DVS frame" of a DVS camera refers to an image or frame into which DVS pixels photographed by the DVS over a time span or a certain number of pixels are integrated. The term "photographing time" of a DVS frame refers to the time at which the DVS pixel is captured or photographed, such as an intermediate time of the time span for the DVS frame, or an intermediate time of the time stamps of all DVS pixels in the DVS frame.

Unless otherwise defined, the technical or scientific terms used herein shall have the ordinary meaning as understood by persons having ordinary skill in the art of the present invention. In the description of the present invention, it should be understood that an orientation or positional relationship indicated by the terms "center," "longitudinal," "lateral," "upper," "lower," "front," "back," "left," "right," "vertical," "horizontal," "top," "bottom," "inner," "outer," etc. is an orientation or positional relationship shown based on the accompanying drawings, is only for the convenience of describing the present invention and simplifying the description, rather than indicating or implying that a device or element referred to must have a specific orientation or be constructed and operated in a specific orientation, and thus cannot be understood as a limitation to the present invention. In addition, the terms "first" and "second" are used for descriptive purposes only and are not to be construed as indicating or implying relative importance.

The DVS camera captures only light intensity changes and then creates asynchronous DVS pixels (pixel events). A DVS pixel or pixel event or event may be represented by pixel or event data, which typically takes the form of [x, y, t, p], where x and y denote the x and y coordinates of the event, t denotes the time stamp indicating the event, and p denotes the polarity of the event, which indicates whether the light intensity change is brightening or darkening. In one or more embodiments, p is +1 when the light intensity becomes stronger and p is −1 when the light intensity becomes weaker. Compared to conventional cameras, the DVS has the advantages of low time delay, no motion blur, high dynamic range, and low power consumption, and so on.

Unlike conventional cameras that create complete images or frames containing continuous pixels, a DVS camera creates only asynchronous DVS pixels that are discrete and discontinuous in space and time, and therefore requires the integration of DVS pixels (pixel events) captured by the DVS camera over a time span to generate a DVS frame. There are several different ways to create DVS frames, such as integrating DVS pixels over a fixed time span or variable time span or integrating a certain number of DVS pixels to form a DVS frame. Methods for integrating DVS pixels into DVS frames are known and will not be described herein.

The present invention provides an eye blink detection method based on a DVS camera. This eye blink detection method performs eye blink detection by determining whether there exist unique pattern characteristics in the DVS frame. In some embodiments, the eye blink detection method determines whether there exists a pattern in which a first color region and a second color region are distributed one above the other in the eye region of the DVS frame, thereby determining whether an eye blink action is being performed. In some embodiments, the eye blink detection method calculates an average height difference value between first color pixels and second color pixels in the eye region and, if the absolute value of that average height difference is greater than a threshold value, determines that there exists a pattern in which a first color region and a second color region are distributed one above the other in the eye region of the DVS frame, thereby determining whether an eye blink action is being performed. In some embodiments, the eye blink detection method further detects eye blink, eye opening, or eye closing actions. In some embodiments, the eye blink detection method can also calculates the eye blink frequency and/or eye blink duration.

In some embodiments according to the present invention, the eye blink, eye opening, and eye closing actions of eyes can be accurately determined by calculating only the average height of the first color pixels and the average height of the second color pixels of the eyes in the DVS frame as well as the height difference between the two. Compared with conventional image processing methods, the method of the present invention is very low in the amount of calculation. In addition, only the location in the DVS frame where a light intensity change occurs has a first color pixel or a second color pixel, which further reduces the amount of calculation. Therefore, the method of the present invention is particularly suitable for image processing at high frame rates (e.g., 200 frames per second), thus ensuring accuracy in eye blink detection.

FIG. 1 illustrates a schematic diagram of an eye blink detection system 100 according to one or more embodiments of the present invention. As shown, the eye blink detection system 100 according to the present invention includes a DVS camera 102. The DVS camera 102 is used to take pictures toward the face 106 of the person 104. The eye blink detection system 100 also includes a processor (not shown) that is connected to the DVS camera 102 and used to receive a stream of DVS pixels from the DVS camera 102 and to perform processing.

Figure 2A:
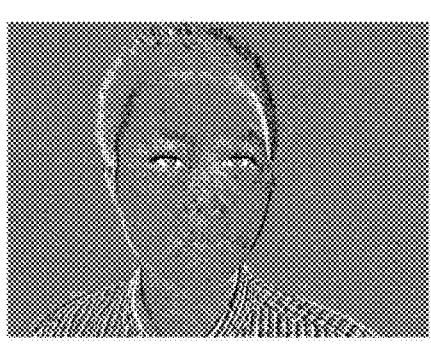
FIGS. 2A-2E illustrate schematic diagrams of a plurality of DVS frames of an eye blink process acquired by an eye blink detection system according to one or more embodiments of the present invention.
Figure 2B:
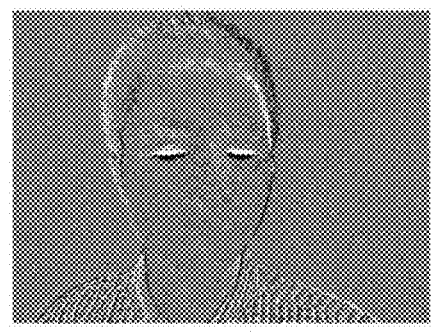
Figure 2C:
Figure 2D:
Figure 2E:
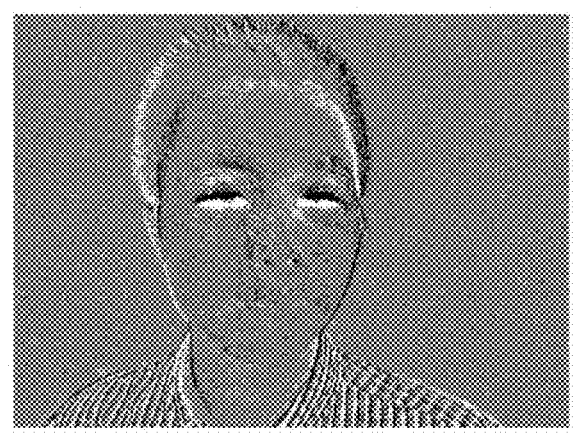

FIGS. 2A-2E illustrate schematic diagrams of a plurality of DVS frames of the eye blink process photographed by the eye blink detection system 100 according to the present invention, wherein FIG. 2A illustrates a DVS frame before eye blinking, FIG. 2B illustrates a DVS frame while the eye is being closed, FIG. 2C illustrates a DVS frame while the eye is substantially fully closed, and FIGS. 2D and 2E illustrate DVS frames while the eye is being opened. In the DVS frames of 2A-2E, the white pixel points indicate that the light intensity becomes stronger, the black pixel points indicate that the light intensity becomes weaker, and the gray pixel points indicate that the light intensity does not change. The pixel colors of the DVS frames of the present invention may not be limited to black, white, and gray. For example, in DVS frames according to some other embodiments of the present invention, the first color pixel points indicate that the light intensity becomes stronger, the second color pixel points indicate that the light intensity becomes weaker, and the third color pixel points indicate that the light intensity does not change. DVS frames according to some other embodiments of the present invention may not be an actual image as shown in FIGS. 2A-2E, but merely a virtual frame concept including DVS pixels over a time span. In this case, a DVS frame may include only first color pixels and second color pixels, but not include third color pixels.

It can be understood by a person skilled in the art that FIGS. 2A-2E are only a few exemplary DVS frames photographed by the eye blink detection system 100, and the number of DVS frames actually photographed by the eye blink detection system 100 may be much larger than that shown in FIGS. 2A-2E. The individual DVS frames shown in FIGS. 2A-2E are DVS frames formed by integrating DVS pixels captured by the DVS camera 102 over a time span of 5 ms. It can be understood by a person skilled in the art that DVS frames can be formed by integrating DVS pixels over a time span different from 5 ms, or they can be formed by integrating a certain number of DVS pixels.

The inventors of the present invention have found through their research that DVS frames taken during eye closing and eye opening processes have very significant features. As shown in FIGS. 2B, 2D, and 2E, there exists a very distinct pattern in which a white region and a black region are distributed one above the other in the eye region of the DVS frame during eye opening and eye closing processes. Specifically, as shown in FIG. 2B, during the eye closing process, the white region is above the black region in the pattern in the eye region of the DVS frame, whereas as shown in FIGS. 2D and 2E, during the eye opening process, the white region is below the black region in the pattern in the eye region of the DVS frame. In contrast, in FIG. 2A before the onset of eye blinking and in FIG. C with the eyes fully closed, the eye region of the DVS frame does not include such a pattern.

Figure 3A:
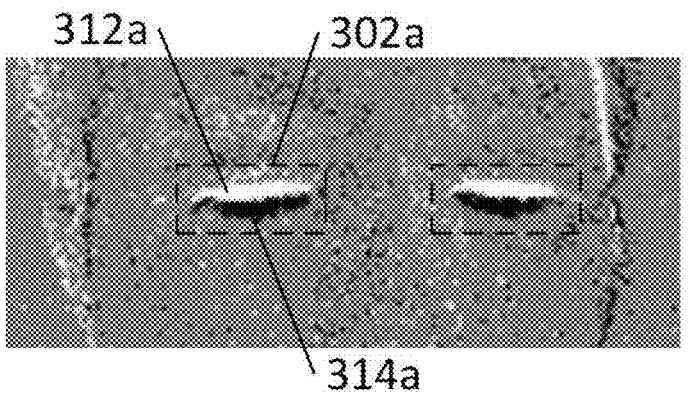
FIG. 3A is a partially enlarged view of FIG. 2B
Figure 3B:
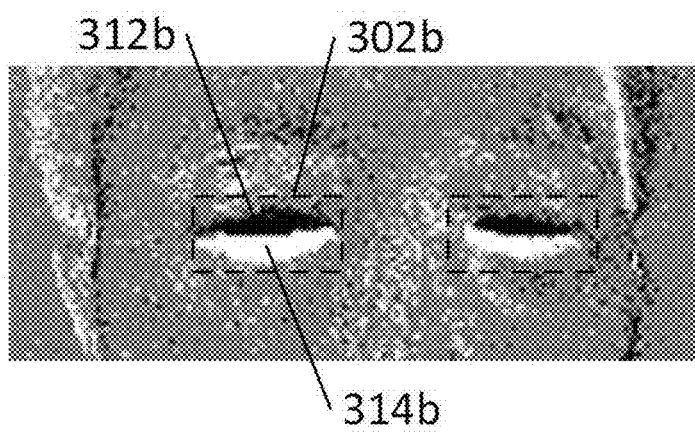
FIG. 3B is a partially enlarged view of FIG. 2D.

FIG. 3A is a partially enlarged view of FIG. 2B and FIG. 3B is a partially enlarged view of FIG. 2D. As shown in FIG. 3A, in the eye region 302a of the DVS frame photographed during the eye closing process, the eye is substantially divided into upper and lower halves, with the upper half 312a of the eye being white and the lower half 314a of the eye being black. In other words, the upper half 312a of the eye is in a substantially horizontal white strip, while the lower half 314a of the eye is in a substantially horizontal black strip. As shown in FIG. 3B, in the eye region 302b of the DVS frame photographed during eye closing process, the eye is substantially divided into upper and lower halves, with the upper half 312b of the eye being black and the lower half 304b of the eye being white. In other words, the upper half 312b of the eye is in a substantially horizontal black strip, while the lower half 314b of the eye is in a substantially horizontal white strip.

Since the patterns of the eye in the DVS frames photographed during the eye opening and closing processes have a very distinctive feature (the white region and the black region are distributed one above the other), the inventors of the present invention use this distinctive feature in the DVS frames to identify eye blink or eye opening and closing actions. In one or more embodiments according to the present invention, when there exists a pattern in which a black region and a white region are distributed one above the other in the eye region of the DVS frame, it can be determined that an eye blink action is being performed at that time. In another one or more embodiments according to the present invention, when there exists a pattern in which a white region and a black region are distributed one above the other and the white region is above the black region in the eye region of the DVS frame, it is determined that an eye closing action is being performed. In one or more embodiments according to the present invention, when there exists a pattern in which a white region and a black region are distributed one above the other and the black region is above the white region in the eye region of the DVS frame, it is determined that an eye opening action is being performed.

In some embodiments according to the present invention, some known image processing techniques can be used to determine whether there exists a pattern in which a black region and a white region are distributed one above the other in the DVS frame, and when there exists a pattern in which a black region and a white region are distributed one above the other in the eye region of the DVS frame, determine that an eye blink action is being performed at that time. In some other embodiments according to the present invention, some known image processing techniques can be used to determine whether there exists a pattern in which a white region and a black region are distributed one above the other and the white region is above the black region in the eye region of the DVS frame, and to determine that an eye closing action is being performed when there exists such a pattern. In some other embodiments according to the present invention, some known image processing techniques can be used to determine that there exists a pattern in which a white region and a black region are distributed one above the other and the black region is above the white region in the eye region of the DVS frame, and to determine that an eye opening action is being performed when there exists such a pattern. In some embodiments according to the present invention, the eye region in the DVS frame can be determined prior to and/or during the determination as previously described. The determination of the eye region in the DVS can be implemented by some known image processing techniques.

The inventors of the present invention also propose, according to the pattern characteristics in the DVS frame during an eye blink or eye opening and eye closing action, a simple and effective method for determining the eye blink, eye opening or eye closing action. As shown in FIG. 3A, the upper half 312a of the eye in the DVS frame is in a substantially horizontal white strip, while the lower half 314a of the eye is in a substantially horizontal black strip, so that the average height of all white pixels of the eye in the DVS frame is higher, while the average height of all black pixels is lower. As shown in FIG. 3B, the upper half 312b of the eye in the DVS frame is in a substantially horizontal black strip, while the lower half 314b of the eye is in a substantially horizontal white strip, so that the average height of all white pixels of the eye in the DVS frame is lower, while the average height of all black pixels is higher. In contrast, in a non-eye opening or non-eye closing DVS frame (e.g., the DVS frames shown in FIG. 2A and FIG. 2C), the distribution of white pixels and black pixels of the eye in the DVS frame is random, and the average height of all white pixels and the average height of all black pixels of the eye in the DVS frame are substantially the same. That is, the inventors of the present invention found that it is possible to determine, based on the relationship between the average height of the white pixels and the average height of the black pixels of the eye in the DVS frame, whether an eye blink action, an eye opening action, or an eye closing action is being performed. When the absolute value of the height difference between the average height of the white pixels and the average height of the black pixels of the eye in the DVS frame is greater than a threshold value, it can be determined that there exits a pattern in which a white region and a black region are distributed one above the other in the eye in the DVS frame, that is, an eye blink action is being performed. When the average height of the white pixels is greater than the average height of the black pixels in the eye in the DVS frame and the absolute value of the height difference is greater than a threshold value, it can be determined that there exists a pattern in which a white region and a black region are distributed one above the other and the white region is above the black region in the eye in the DVS frame, that is, an eye closing action is being performed. When the average height of the white pixels is less than the average height of the black pixels in the eye in the DVS frame and the absolute value of the height difference is greater than a threshold value, it can be determined that there exists a pattern in which a white region and a black region are distributed one above the other and the white region is below the black region in the eye in the DVS frame, that is, an eye opening action is being performed.

In embodiments according to the present invention, the eye blink, eye opening, and eye closing actions of eyes can be accurately determined by calculating only the average height of all white pixels and the average height of all black pixels of the eyes in the DVS frame as well as the height difference between the two. Compared with conventional image processing methods, the method of the present invention is very low in the amount of calculation. In addition, due to the characteristics of the DVS camera, only the location in the DVS frame where a light intensity change occurs has a white pixel or a black pixel, and the location where the light intensity does not change has a gray pixel, which further reduces the amount of calculation.

In the embodiment shown in FIGS. 2A-2E, the DVS frame is formed by integrating DVS pixels captured by the DVS camera 102 over a time span of 5 ms. Therefore, in this embodiment, 200 DVS frames can be generated per second. As mentioned above, the method of the present invention is very low in the amount of calculation when determining eye blink, eye opening, and eye closing actions, thus ensuring image processing at a high frame rate (e.g., 200 frames per second).

In embodiments of the present invention, due to the high frame rate (e.g., 200 frames per second), a larger number of DVS frames can be obtained for each eye blink process and a larger number of DVS frames can be available for each eye opening process or each eye closing process. Therefore, the eye blink detection method according to the present invention can clearly determine the complete process of eye closing followed by eye opening during the eye blink process, and can thus calculate the eye blink frequency more accurately. In addition, by analyzing the entire process of eye closing followed by eye opening during the eye blink process, the duration of eye blinking can be calculated more accurately. These two indicators, the eye blink frequency and the eye blink duration, are very useful in determining a person's mental state, such as whether he or she is in a fatigue driving state.

Figure 4:
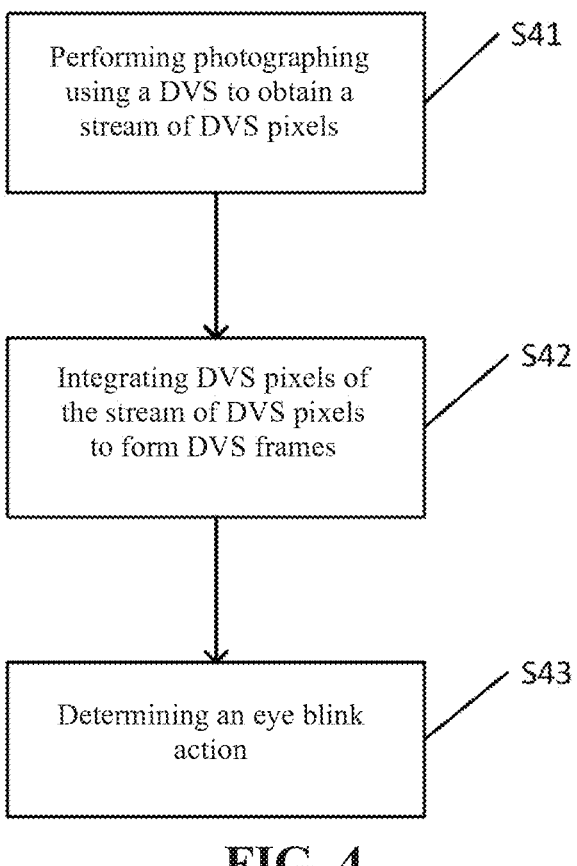
FIG. 4 illustrates an eye blink detection method according to one or more embodiments of the present invention.

FIG. 4 illustrates an eye blink detection method according to one or more embodiments of the present invention. At step S41, a face of a person is photographed using a DVS camera to obtain a stream of DVS pixels. The face photographed by the DVS camera includes at least the eyes. Unlike conventional cameras, the DVS camera captures only light intensity changes and then creates asynchronous DVS pixels (pixel events). These DVS pixels may be discrete and discontinuous in space and time. The DVS pixels that may be spatially and temporally discrete and discontinuous and that are continuously generated by the DVS camera during the photographing process are referred to here as the stream of DVS pixels. At step S42, a plurality of DVS pixels are formed by integrating or combining DVS pixels of the stream of DVS pixels. In some embodiments, DVS pixels (pixel events) captured by the DVS camera over a fixed time span may be integrated or combined to generate one DVS frame. In other embodiments, DVS pixels over a variable time span may be integrated or combined to form one DVS frame. In some other embodiments, a certain number of DVS pixels may be integrated or combined to form one DVS frame. At step S43, it can be determined whether there exists an eye blink action based on the formed DVS frame. In some embodiments, if there exists a pattern in which a white region and a black region are distributed one above the other in the eye region of the DVS frame, it is determined that there exists an eye blink action. In one or more embodiments according to the present invention, determining an eye blink action comprises the steps of:

calculating a first average height of white pixels in the eye region; calculating a second average height of black pixels in the eye region; subtracting the second average height of the black pixels from the first average height of the white pixels in the eye region to obtain an average height difference value; and when the absolute value of the average height difference value is greater than a threshold value, determining that there exists a pattern in which a white region and a black region are distributed one above the other in the eye region of the DVS frame, that is, there exists an eye blink action. This threshold value may be determined experimentally. In one or more embodiments, the threshold value may be a value related to the eye height, for example, $\frac{1}{8}$, $\frac{1}{10}$, $\frac{1}{15}$, $\frac{1}{20}$, etc., of the eye height.

Figure 5:
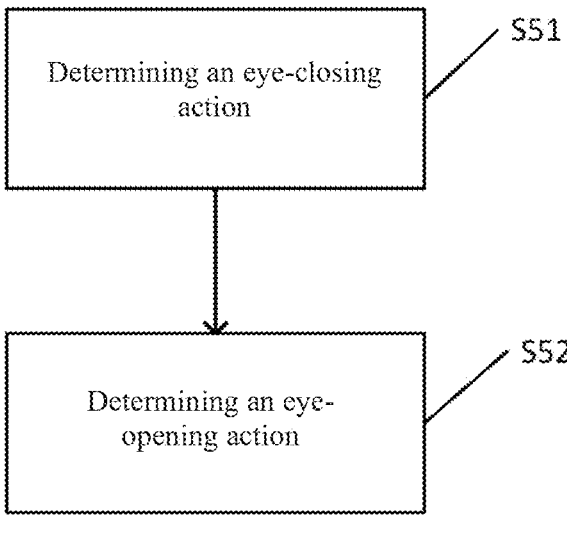
FIG. 5 illustrates specific steps of determining an eye blink action (step S33) according to some embodiments of the present invention.

FIG. 5 illustrates specific steps of determining an eye blink action (step S33) according to some embodiments of the present invention. In the embodiment of FIG. 5, determining an eye blink action includes step S51: determining an eye closing action, and step S52: determining an eye opening action. In the embodiment of FIG. 5, in a plurality of DVS frames generated from the stream of DVS pixels of the DVS camera, an eye closing action is determined first, and then an eye opening action is determined in the subsequent DVS frames. This detects the entire eye blink process and enables more accurate detection of the eye blink process. At step S51, if there exists a pattern in which a white region and a black region are distributed one above the other in the eye region of the DVS frame and the white region is above the black region, it is determined that an eye closing action is being performed. At step S52, if there exists a pattern in which a white region and a black region are distributed one above the other and the white region is below the black region in the eye region of the DVS frame, it is determined that an eye opening action is being performed. In another one or more embodiments according to the present invention, at step S51, when the absolute value of the average height difference value between the average height of the white pixels and the average height of the black pixels in the eye region of the DVS frame is greater than a threshold value and the average height of the white pixels is greater than the average height of the black pixels, it is determined that there exists a pattern in which a white region and a black region are distributed one above the other and the white region is above the black region in the eye region of the DVS frame, that is, an eye closing action is being performed. At step S52, when the absolute value of the average height difference value between the average height of the white pixels and the average height of the black pixels in the eye region of the DVS frame is greater than a threshold value and the average height of the white pixels is less than the average height of the black pixels, it is determined that there exists a pattern in which a white region and a black region are distributed one above the other and the white region is below the black region in the eye region of the DVS frame, that is, an eye opening action is being performed. In some embodiments according to the present invention, the threshold value for determining an eye closing action may be the same or different from the threshold value for determining an eye opening action.

In another one or more embodiments according to the present invention, at step S51, a plurality of adjacent eye-closing DVS frames (a first set of adjacent DVS frames) are determined among the plurality of DVS frames generated from the stream of DVS pixels of the DVS camera, wherein for each eye-closing DVS frame, an average height difference value between white pixels and black pixels is greater than a threshold value and an average height of the white pixels is greater than an average height of the black pixels. At step S52, a plurality of adjacent eye-opening DVS frames (a second set of adjacent DVS frames) are determined among subsequent DVS frames to the plurality of eye-closing DVS frames in the plurality of DVS frames, wherein for each eye-opening DVS frame, an average height difference value between white pixels and black pixels is greater than a threshold value and an average height of the white pixels is less than an average height of the black pixels. In this way, a single complete eye blink including a plurality of eye-closing DVS frames and a plurality of eye-opening DVS frames is determined through steps S51 and S52.

Figure 6:
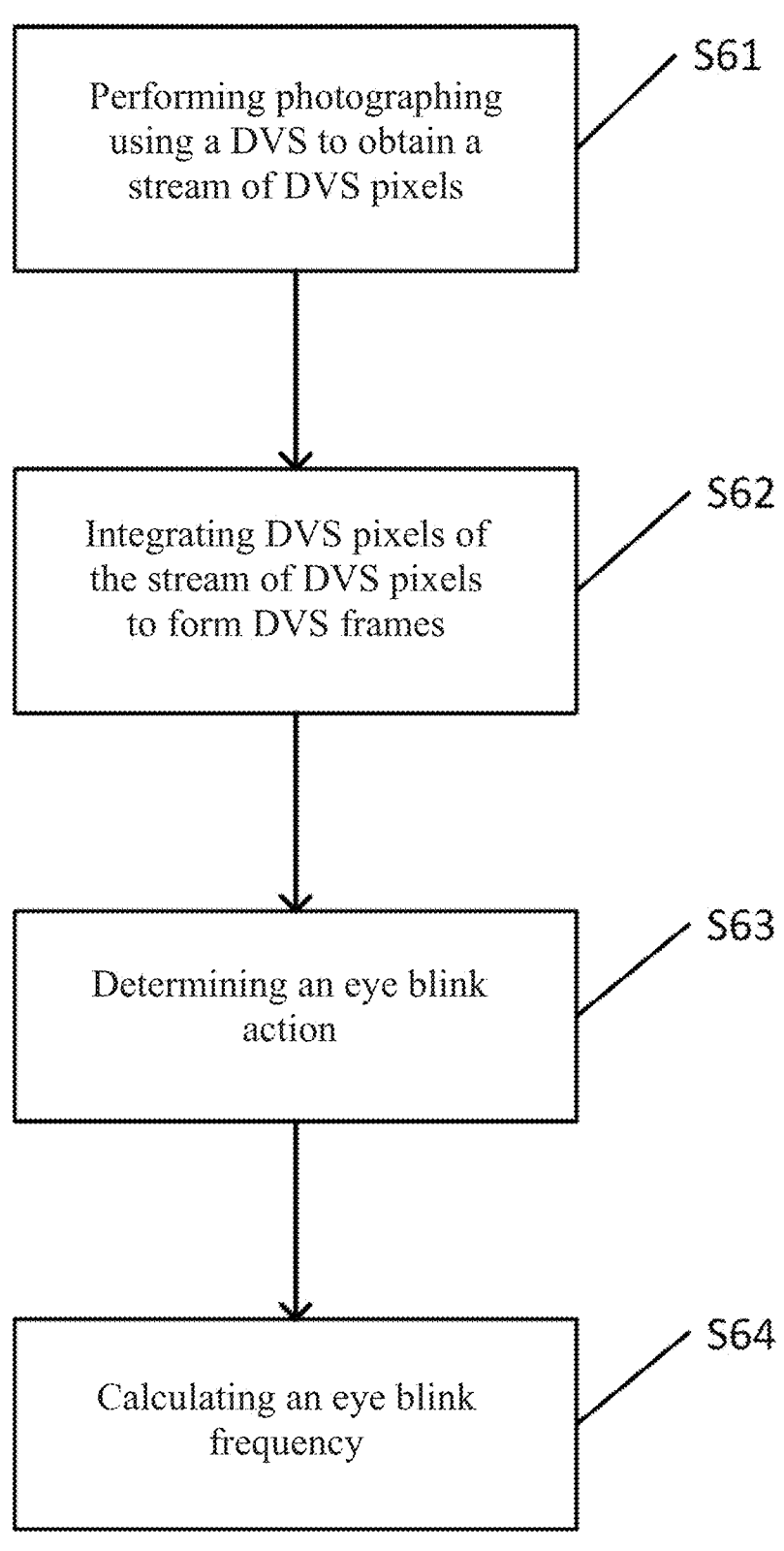
FIG. 6 illustrates an eye blink detection method according to one or more embodiments of the present invention.

FIG. 6 illustrates an eye blink detection method according to one or more embodiments of the present invention. Steps S61, S62, and S63 of the eye blink detection method illustrated in FIG. 6 are substantially the same or similar to steps S41, S42, and S43 illustrated in FIG. 4 and will not be repeated herein. At step S64, step S63 is cyclically performed (or steps S61-63 are cyclically performed) so that multiple eye blinks are determined and the eye blink frequency is calculated in combination with the photographing time of each DVS frame.

Figure 7:
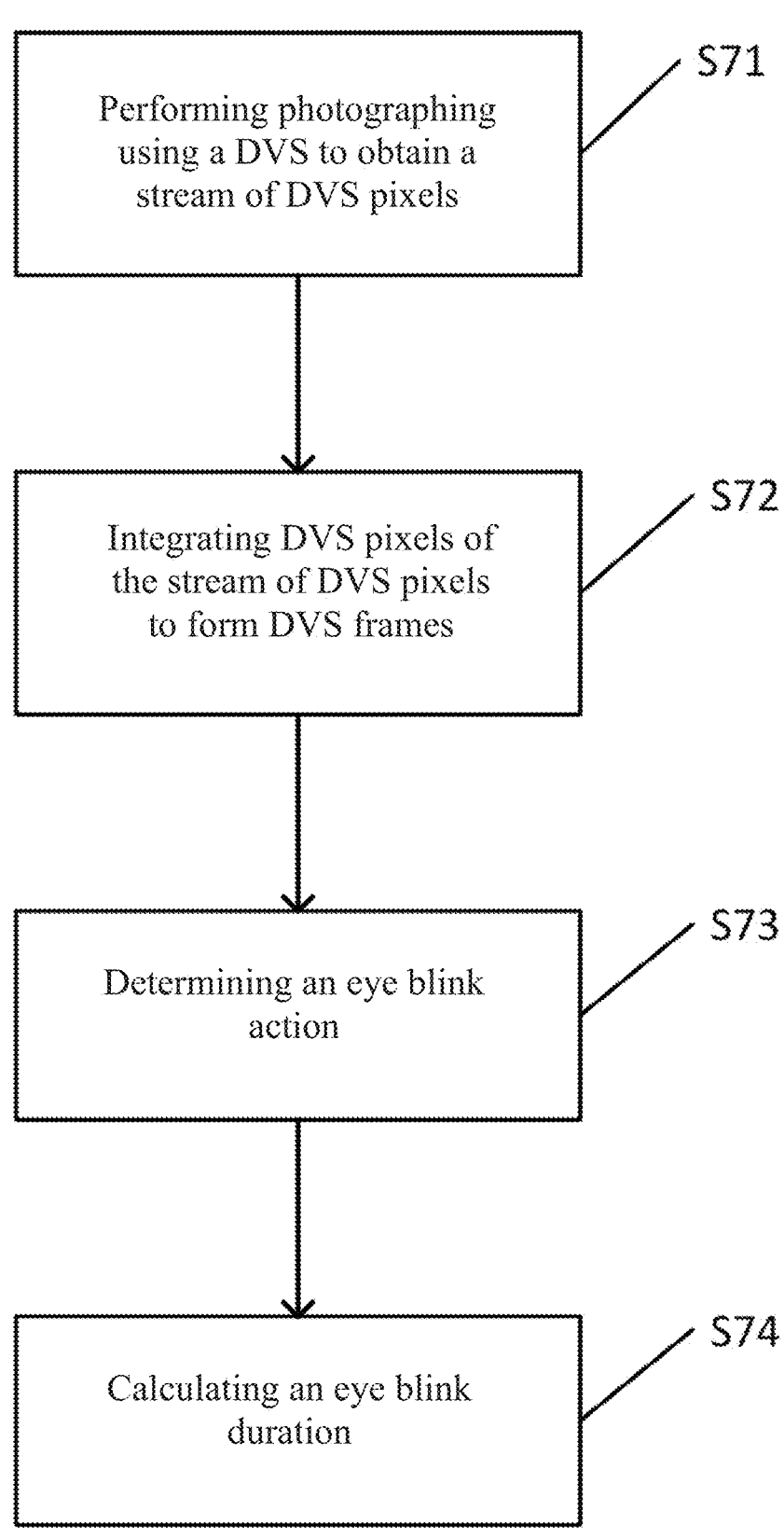
FIG. 7 illustrates an eye blink detection method according to one or more embodiments of the present invention.

FIG. 7 illustrates an eye blink detection method according to one or more embodiments of the present invention. Steps S71, S72, and S73 of the eye blink detection method illustrated in FIG. 7 are substantially the same or similar to steps S41, S42, and S43 illustrated in FIG. 4 and will not be repeated herein. At step S74, a reference eye-closing DVS frame (first reference DVS frame) is determined among the plurality of eye-closing DVS frames (the first set of adjacent DVS frames) determined at step S51, and a reference eye-opening DVS frame (second reference DVS frame) is determined among the plurality of eye-opening DVS frames (the second set of adjacent DVS frames) determined at step S52, and then an eye blink duration is determined based on a photographing time difference value between the reference eye-closing DVS frame and the reference eye-opening DVS frame. The actual eye blink duration is typically greater than the photographing time difference value between the reference eye-closing DVS frame and the reference eye-opening DVS frame. In some embodiments according to the present invention, the relationship between the eye blink duration and the aforementioned photographing time difference value can be determined experimentally. In some embodiments according to the present invention, the eye blink duration may be a linear function of the photographing time difference value between the reference eye-closing DVS frame and the reference eye-opening DVS frame.

In some embodiments according to the present invention, the reference eye-closing DVS frame or the reference eye-opening DVS frame is a DVS frame with the most distinctive pattern feature as shown in FIG. 3A and FIG. 3B during the eye closing and eye opening processes. In these embodiments, the reference eye-closing DVS frame is a DVS frame among the plurality of eye-closing DVS frames that has the largest absolute value of the average height difference value of white pixels and black pixels, and the reference eye-opening DVS frame is a DVS frame among the plurality of eye-opening DVS frames that has the largest absolute value of the average height difference value of white pixels and black pixels.

In some other embodiments according to the present invention, the reference eye-closing DVS frame is a DVS frame among the plurality of eye-closing DVS that has a photographing time at a center in the order of the photographing times, and the reference eye-opening DVS frame is a DVS frame among the plurality of eye-opening DVS frames that has a photographing time at a center in the order of the photographing times. In some other embodiments according to the present invention, the reference eye-closing DVS frame may be other DVS frames among the plurality of eye-closing DVS frames, and the reference eye-opening DVS frame may be other DVS frames among the plurality of eye-opening DVS frames.

In one or more embodiments according to the present invention, the eye blink detection method further comprises determining the eye region in the DVS frame prior to determining whether there exists an eye blink action.

The eye blink detection shown in FIG. 6 is used for calculating the eye blink frequency and the eye blink detection shown in FIG. 7 is used for calculating the eye blink duration. It can be understood by a person skilled in the art that the methods of FIG. 6 and FIG. 7 can be combined together. That is, in one or more embodiments according to the present invention, the eye blink detection not only includes calculating the eye blink frequency, but also includes calculating the eye blink duration.

Multiple aspects of the present invention can be embodied as systems, methods, or computer program products. Therefore, multiple aspects of the present invention may take the form of fully hardware embodiments, fully software embodiments (including firmware, resident software, microcode, etc.), or embodiments that combine software and hardware aspects. Alternatively, aspects of the present disclosure may take the form of a computer program product embodied in one or more computer-readable media, the one or more computer readable media having computer readable program code stored thereon.

The computer-readable medium may be a computer-readable signal medium or a computer-readable storage medium. The computer readable storage medium may be (for example), but not limited to, an electronic, magnetic, optical, electromagnetic, infrared or semiconductor system, apparatus or device or any suitable combination of the foregoing. More specific examples (a non-exhaustive list) of computer-readable storage media would include the following: portable computer disks, hard disks, random access memory (RAM), read-only memory (ROM), erasable programmable read-only memory (EPROM or flash memory), portable compact disc read-only memory (CD-ROM), optical storage devices, magnetic storage devices, or any suitable combination of the above. In the context of this document, a computer-readable storage medium may be any tangible medium, and the tangible medium may contain or store a program for use by or together with an instruction execution system, apparatus or device.

Multiple aspects of the present invention have been described above with reference to flow charts and/or block diagrams of the method, apparatus (system), and computer program product according to embodiments of the present invention. It should be understood that each of the blocks in the flowcharts and/or block diagrams and combinations of the blocks in the flowcharts and/or block diagrams may be implemented by computer program instructions. These computer program instructions may be provided to a processor of a general purpose computer, a specialized computer, or other programmable data processing apparatus to generate a machine such that the instructions executed by the processor of the computer or other programmable data processing apparatus enable the implementation of the functions/actions specified in one or more flow chart blocks and/or one or more block diagram blocks. Such a processor may be, but is not limited to, a general purpose processor, a specialized processor, an application specific processor, or a field programmable processor or gate array.

The present invention can be implemented in the following manners:

Item 1: An eye blink detection method based on a DVS camera, comprising:

photographing a face using a DVS camera to obtain a stream of DVS pixels;

integrating DVS pixels of the stream of DVS pixels to form a plurality of DVS frames, wherein each DVS frame of the plurality of DVS frames comprises a plurality of first color pixels and a plurality of second color pixels, each of the first color pixel being associated with one or more DVS pixels indicating a brightening event and each of the second color pixel being associated with one or more DVS pixels indicating a darkening event; and determining whether there exists an eye blink action in at least one DVS frame of the plurality of DVS frames, wherein the step of determining whether there exists an eye blink action comprises: determining whether there exists a pattern in which a first color region and a second color region are distributed one above the other in an eye region of the at least one DVS frame.

Item 2: The eye blink detection method of item 1, wherein each DVS frame of the plurality of DVS frames further comprises a plurality of third color pixels, the third color pixels being not associated with a DVS pixel indicating a brightening event or a DVS pixel indicating a darkening event.

Item 3: The eye blink detection method of either of items 1-2, wherein the step of determining whether there exists an eye blink action further comprises: determining that an eye closing action is being performed when the first color region is above the second color region in the pattern.

Item 4: The eye blink detection method of any one of items 1-3, wherein the step of determining whether there exists an eye blink action further comprises: determining that an eye opening action is being performed when the second color region is above the first color region in the pattern.

Item 5: The eye blink detection method according to any one of items 1-4, wherein the step of determining whether there exists an eye blink action further comprises:

calculating an average height difference value for each DVS frame of the at least one DVS frame, wherein the average height difference value is an average height difference value between first color pixels and second color pixels in the eye region of the corresponding DVS frame; and determining, when an absolute value of the average height difference value is greater than a threshold value, that there exists a pattern in which a first color region and a second color region are distributed one above the other in the eye region of the corresponding DVS frame.

Item 6: The eye blink detection method of any one of items 1-5, wherein the step of calculating an average height difference value comprises:

calculating a first average height of the first color pixels in the eye region;

calculating a second average height of the second color pixels in the eye region; and calculating the average height difference value by subtracting the second average height from the first average height.

Item 7: The eye blink detection method of any one of items 1-6, further comprising calculating an eye blink duration after the step of determining whether there exists an eye blink action, the step of calculating an eye blink duration comprising:

determining a first set of adjacent DVS frames among the plurality of DVS frames, wherein the average height difference value for each DVS frame of the first set of adjacent DVS frames is positive and its absolute value is greater than a first threshold value;

determining a second set of adjacent DVS frames among subsequent DVS frames to the first set of adjacent DVS frames of the plurality of DVS frames, wherein the average height difference value for each DVS frame of the second set of adjacent DVS frames is negative and its absolute value is greater than a second threshold value;

determining a first reference DVS frame in the first set of adjacent DVS frames;

determining a second reference DVS frame in the second set of adjacent DVS frames; and calculating the eye blink duration according to a time difference value between a photographing time of the first reference DVS frame and a photographing time of the second reference DVS frame.

Item 8: The eye blink detection method of any one of items 1-7, wherein the first reference DVS frame is a DVS frame among the first set of adjacent DVS frames which is at a center in the order of time, and the second reference DVS frame is a DVS frame among the second set of adjacent DVS frames which is at a center in the order of time.

Item 9: The eye blink detection method of any one of items 1-8, wherein the first reference DVS frame is a DVS frame among the first set of adjacent DVS frames that has the largest absolute value of the average height difference value, and the second reference DVS frame is a DVS frame among the second set of adjacent DVS frames that has the largest absolute value of the average height difference value.

Item 10: The eye blink detection method of any one of items 1-9, further comprising determining a plurality of complete eye blinks after the step of determining whether there exists an eye blink action, the step of determining each complete eye blink of the plurality of complete eye blinks comprising:

determining a first set of adjacent DVS frames among the plurality of DVS frames, wherein the average height difference value for each DVS frame of the first set of adjacent DVS frames is positive and is greater than a first threshold value;

determining a second set of adjacent DVS frames among subsequent DVS frames to the first set of adjacent DVS frames of the plurality of DVS frames, wherein the average height difference value for each DVS frame of the second set of adjacent DVS frames is negative and is greater than a second threshold value; and determining one complete eye blink based on the determined first set of adjacent DVS frames and the determined second set of adjacent DVS frames.

Item 11: The eye blink detection method of any one of items 1-10, further comprising calculating an eye blink frequency using photographing times of at least some DVS frames among DVS frames related to the plurality of complete eye blinks.

Item 12: The eye blink detection method of any one of items 1-11, further comprising: determining the eye region in each DVS frame of the at least one DVS frame prior to determining whether there exists an eye blink action.

Item 13: An eye blink detection system, the system comprising: a DVS camera for performing photographing so as to obtain a stream of DVS pixels; a processor connected to the DVS camera, the processor being configured to execute an eye blink detection method of any one of items 1-12.

Item 14: A vehicle, the vehicle comprising: a vehicle body; and an eye blink detection system of item 13 that is mounted in the vehicle body.

The foregoing descriptions are merely example embodiments adopted to illustrate the principles of the present invention, and are not used to limit the protection scope of the present invention. For those of ordinary skill in the art, various modifications and improvements can be made without departing from the spirit and essence of the present invention, and these modifications and improvements are also within the protection scope of the present invention.

The invention claimed is:

1. An eye blink detection method based on a DVS camera, comprising:

photographing a face using the DVS camera to obtain a stream of DVS pixels;

integrating DVS pixels of the stream of DVS pixels to form a plurality of DVS frames, wherein each DVS frame of the plurality of DVS frames comprises a plurality of first color pixels and a plurality of second color pixels, each of the first color pixels being associated with one or more DVS pixels indicating a brightening event and each of the second color pixels being associated with one or more DVS pixels indicating a darkening event; and determining whether there exists an eye blink action in at least one DVS frame of the plurality of DVS frames, wherein the step of determining whether there exists an eye blink action comprises: determining whether there exists a pattern in which a first color region and a second color region are distributed one above the other in an eye region of the at least one DVS frame, wherein the step of determining whether there exists an eye blink action further comprises:

calculating an average height difference value for each DVS frame of the at least one DVS frame, wherein the average height difference value is an average height difference value between first color pixels and second color pixels in the eye region of the at least one DVS frame; and determining, when an absolute value of the average height difference value is greater than a threshold value, that there exists a pattern in which a first color region and a second color region are distributed one above the other in the eye region of the at least one DVS frame.

2. The eye blink detection method of claim 1, wherein each DVS frame of the plurality of DVS frames further comprises a plurality of third color pixels, the third color pixels being not associated with a DVS pixel indicating a brightening event or a DVS pixel indicating a darkening event.

3. The eye blink detection method of claim 1, wherein the step of determining whether there exists an eye blink action further comprises: determining that an eye closing action is being performed when the first color region is above the second color region in the pattern.

4. The eye blink detection method of claim 1, wherein the step of determining whether there exists an eye blink action further comprises: determining that an eye opening action is being performed when the second color region is above the first color region in the pattern.

5. The eye blink detection method of claim 1, wherein the step of calculating an average height difference value comprises:

calculating a first average height of the first color pixels in the eye region;

calculating a second average height of the second color pixels in the eye region; and calculating the average height difference value by subtracting the second average height from the first average height.

6. The eye blink detection method of claim 1, further comprising calculating an eye blink duration after the step of determining whether there exists an eye blink action, the step of calculating an eye blink duration comprising:

determining a first set of adjacent DVS frames among the plurality of DVS frames, wherein the average height difference value for each DVS frame of the first set of adjacent DVS frames is positive and its absolute value is greater than a first threshold value;

determining a second set of adjacent DVS frames among subsequent DVS frames to the first set of adjacent DVS frames of the plurality of DVS frames, wherein the average height difference value for each DVS frame of the second set of adjacent DVS frames is negative and its absolute value is greater than a second threshold value;

determining a first reference DVS frame in the first set of adjacent DVS frames;

determining a second reference DVS frame in the second set of adjacent DVS frames; and calculating the eye blink duration according to a time difference value between a photographing time of the first reference DVS frame and a photographing time of the second reference DVS frame.

7. The eye blink detection method of claim 6, wherein the first reference DVS frame is a DVS frame among the first set of adjacent DVS frames which is at a center in the order of time, and the second reference DVS frame is a DVS frame among the second set of adjacent DVS frames which is at a center in the order of time.

8. The eye blink detection method of claim 6, wherein the first reference DVS frame is a DVS frame among the first set of adjacent DVS frames that has the largest absolute value of the average height difference value, and the second reference DVS frame is a DVS frame among the second set of adjacent DVS frames that has the largest absolute value of the average height difference value.

9. The eye blink detection method of claim 1, further comprising determining one or more complete eye blinks after the step of determining whether there exists an eye blink action, the step of determining one or more complete eye blinks comprising:

determining a first set of adjacent DVS frames among the plurality of DVS frames, wherein the average height difference value for each DVS frame of the first set of adjacent DVS frames is positive and is greater than a first threshold value;

determining a second set of adjacent DVS frames among subsequent DVS frames to the first set of adjacent DVS frames of the plurality of DVS frames, wherein the average height difference value for each DVS frame of the second set of adjacent DVS frames is negative and is greater than a second threshold value; and determining one or more complete eye blinks based on the determined first set of adjacent DVS frames and the determined second set of adjacent DVS frames.

10. The eye blink detection method of claim 9, further comprising calculating an eye blink frequency using photographing times of at least some DVS frames among DVS frames related to the one or more complete eye blinks.

11. The eye blink detection method of claim 1, further comprising: determining the eye region in each DVS frame of the at least one DVS frame prior to determining whether there exists an eye blink action.

12. An eye blink detection system, the system comprising:

a DVS camera for performing photographing so as to obtain a stream of DVS pixels; and a processor connected to the DVS camera, the processor being configured to execute the eye blink detection method of claim 1.

13. A motorized vehicle, the motorized vehicle comprising:

a vehicle body; and the eye blink detection system of claim 12 that is mounted in the vehicle body.

\* \* \* \* \*